United States Patent
Nakano et al.

(10) Patent No.: US 8,111,604 B2
(45) Date of Patent: Feb. 7, 2012

(54) FABRICATION METHOD OF MULTILAYER OPTICAL RECORD MEDIUM AND RECORDING APPARATUS FOR MULTILAYERED OPTICAL RECORD MEDIUM

(75) Inventors: Masaharu Nakano, Tsurugashima (JP); Masakazu Ogasawara, Tsurugashima (JP); Makoto Sato, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 169 days.

(21) Appl. No.: 12/593,036

(22) PCT Filed: Mar. 29, 2007

(86) PCT No.: PCT/JP2007/056871
§ 371 (c)(1),
(2), (4) Date: Sep. 25, 2009

(87) PCT Pub. No.: WO2008/120354
PCT Pub. Date: Oct. 9, 2008

(65) Prior Publication Data
US 2010/0046349 A1    Feb. 25, 2010

(51) Int. Cl.
*G11B 7/24* (2006.01)
(52) U.S. Cl. ............... 369/275.3; 369/279; 369/277; 369/278; 369/284; 369/275.4; 369/94; 369/53.27; 369/44.25
(58) Field of Classification Search .............. None
See application file for complete search history.

(56) References Cited

U.S. PATENT DOCUMENTS

| | | | |
|---|---|---|---|
| 2002/0150022 A1* | 10/2002 | Tolmachev | 369/103 |
| 2002/0191501 A1* | 12/2002 | Ueno | 369/44.13 |
| 2004/0165518 A1* | 8/2004 | Horimai et al. | 369/94 |
| 2005/0226134 A1* | 10/2005 | Miyamoto | 369/275.3 |
| 2005/0243693 A1* | 11/2005 | Miyamoto et al. | 369/275.3 |
| 2006/0198285 A1* | 9/2006 | Ueki | 369/275.3 |
| 2007/0258344 A1* | 11/2007 | Rogers et al. | 369/112.01 |
| 2009/0097376 A1* | 4/2009 | Yamaoka et al. | 369/94 |

FOREIGN PATENT DOCUMENTS

| | | |
|---|---|---|
| JP | 56-000037 | 1/1981 |
| JP | 61-85638 | 5/1986 |
| JP | 2835074 | 12/1990 |
| JP | 11-501143 | 1/1999 |
| JP | 2001-307344 | 11/2001 |
| JP | 2004-2410088 | 8/2004 |

* cited by examiner

*Primary Examiner* — Joseph Haley
*Assistant Examiner* — Ifedayo Iluyomade
(74) *Attorney, Agent, or Firm* — Drinker Biddle & Reath LLP (57) ABSTRACT

A fabrication method of a multilayer optical recording medium having a plurality of recording layers, comprises a step of preparing an optical recording medium having at least one record area; a write-position mark generating step of recording write-position marks in the record area beforehand; a step of preparing an optical system including a common objective lens to focus a data recording beam and a position mark recording beam on different positions in a thickness direction of the record area; a first data writing step of writing data between the write-position marks with following the write-position marks by the data recording beam; a position mark recording step of, in parallel with the first data writing step, recording new write-position marks in the record area by the position mark recording beam; and a second data writing step of writing data between the new write-position marks with following the new write-position marks by the data recording beam.

8 Claims, 9 Drawing Sheets

FABRICATION METHOD OF MULTILAYER OPTICAL RECORD MEDIUM AND RECORDING APPARATUS FOR MULTILAYERED OPTICAL RECORD MEDIUM

TECHNICAL FIELD

The present invention relates to a fabrication method of a multilayer optical recording medium having multiple record layers and a recording apparatus of multilayer optical recording medium.

BACKGROUND ART

In these years, optical discs such as CDs and DVDs are widely used in a broad range of applications such as the distribution of music, moving images, or software, the backup of a hard disk, digital video recording, and so on. Further increase in recording density in correspondence to further longer video recording time, smaller discs, and the spread of high-vision video, is desired and expected for the future. Examples of fundamental techniques for improving recording densities of optical discs include shortening the wavelength of the recording light source and increasing the resolution of the optical head lens, to mention two examples. For the next generation optical discs, recording capacities of about 25 GB per layer for 12 cm diameter discs and about 50 GB for double recording layer discs can be secured since a blue-violet laser (wavelength; 400 nm) is adopted as the recording light source. As means for further increase in recording density, a multilayer technology that increases the total number of recording layers of optical discs is attracting attention. This multilayer technology is a technology specific to optical discs that uses their transmissiveness to light and is a technology that selectively performs recording/reproduction by placing focus on an arbitrary recording layer while moving the focal position of the light spot in a direction of optical axis.

Patent literature 1 describes a multilayer optical disc apparatus which, while tracking based on tracking fixed information provided in a recording surface of an optical recording medium having multiple recording surfaces, records/reproduces data onto/from a recording surface other than the recording surface provided with the fixed information, and thereafter while tracking with the data as tracking information, records/reproduces data onto/from a recording surface other than the recording surfaces.

Patent literature 2 describes an information recording/reproducing apparatus which, while focusing a first light beam on a guide track layer of an information recording medium comprising a plurality of recording regions each having multiple recording layers and a plurality of guide track layers respectively for the plurality of recording regions, focuses a second light beam on any recording layer in the corresponding recording region to record/reproduce information.

Patent literature 3 describes a recording/reproducing method which, when recording/reproducing a recording medium having formed therein multiple recording layers, in only one of which a guide groove is provided, focuses a first light beam on the guide groove to track that recording layer, thereby performing the tracking of a second light beam simultaneously projected on another recording layer.

Patent literature 1: Japanese Patent Publication No. 2835074

Patent literature 2: Japanese Patent Kokai No. 2001-307344

Patent literature 3: Japanese Patent Kokai No. 2004-241088

DISCLOSURE OF THE INVENTION

Problems to be Solved by the Invention

In order to record information data such as video or music on each recording layer of a multilayer optical recording medium, three-dimensional position control of the focal position of a beam spot is needed. However, it is generally difficult to produce a recording medium having write-position marks respectively for recording layers recorded in layers beforehand as shown in the above patent literature 2. For media described in the above patent literatures 1 to 3, because data recording layers are separate from tracking layers, accurate servo control is difficult to perform. That is, in order to perform accurate servo control, it is desirable that tracking be performed based on a write-position mark provided in the same layer where to record data. Further, in the multilayer optical disc apparatus described in the patent literature 1, since using recorded data in the place of tracking information, it is difficult to maintain servo control at non-recorded areas such as data breaks. Yet further, in the optical recording/reproducing apparatus described in the patent literature 3, because one of the multiple beams needs to be always focused on the only guide groove irrespective of the data recording position, a mechanism that can vary the focal distance of the lens is needed, and thus the configuration becomes complex.

The present invention was made in view of the above facts, and an object thereof is to provide a multilayer optical recording medium recording apparatus and method capable of accurate servo control when recording data for a recording medium having a write-position mark for each of multiple recording layers not recorded beforehand, the apparatus having a simple configuration.

Measure to Solve the Problems

According to the present invention, there is provided a fabrication method of a multilayer optical recording medium having a plurality of recording layers. The fabrication method comprises a step of preparing an optical recording medium having at least one record area; a write-position mark generating step of recording write-position marks in the record area beforehand; a step of preparing an optical system including a common objective lens to focus a data recording beam and a position mark recording beam on different positions in a thickness direction of the record area; a first data writing step of writing data between the write-position marks with following the write-position marks by the data recording beam; a position mark recording step of, in parallel with the first data writing step, recording new write-position marks in the record area by the position mark recording beam; and a second data writing step of writing data between the new write-position marks with following the new write-position marks by the data recording beam.

Further, according to the present invention, there is provided another fabrication method of a multilayer optical recording medium having a plurality of recording layers. The fabrication method comprises a step of preparing an optical recording medium having at least one record area where write-position marks are formed beforehand; a step of preparing an optical system including a common objective lens to focus a data recording beam and a position mark recording beam on different positions in a thickness direction of the record area; a first data writing step of writing data between the write-position marks with following the write-position marks by the data recording beam; a position mark recording step of, in parallel with the first data writing step, recording new write-position marks in the record area by the position mark recording beam; and a second data writing step of writing data between the new write-position marks with following the new write-position marks by the data recording beam.

Yet further, according to the present invention, there is provided a multilayer optical record medium recording apparatus which records data into a multilayer optical recording medium having a plurality of recording layers. The recording apparatus comprises a first light source drive circuit that generates a first drive signal having signal levels corresponding to data to be recorded; a second light source drive circuit that generates a second drive signal having signal levels corresponding to a write-position mark to be recorded; a data recording/reading light source that emits a data recording beam of emission intensity according to the first drive signal and a reading beam to read the write-position mark by; a position mark recording light source that emits a position mark recording beam of emission intensity according to the second drive signal; a photo-detector that generates an electrical signal according to a received light amount; an optical system having an irradiation optical path leading each the beam to the multilayer optical recording medium and a reflection optical path leading the reading beam reflected by the multilayer optical recording medium to the photo-detector; and servo means that servo-controls a focal position of the data recording beam based on the electrical signal.

Further, according to the present invention, there is provided a multilayer optical recording medium having a plurality of recording layers, wherein recording layers having both information data and a write-position mark and at least one recording layer having only information data recorded thereon are laid one over the other alternately.

EXPLANATION OF REFERENCE NUMERALS

1 Controller
2 Servo circuit
3 First light source drive circuit
4 Second light source drive circuit
5 Lens drive means
11 Data recording light source
12 Position mark recording light source
21 Photo-detector
22 Signal processing circuit
30 Record medium
31 First record area
31-1 Recording layer
32 Second record area
32-1 to 32-8 Recording layer
33 Spacer layer
41-1 to 41-2 Write-position mark
42-1 to 42-2 Write-position mark
B1 Data recording beam
B2 Position mark recording beam

DETAILED DESCRIPTION OF THE INVENTION

Embodiments of the present invention will be described with reference to the drawings. The same reference numerals are used to denote substantially the same or equivalent constituents or parts throughout the figures cited below.

Embodiment 1

Figure 1:
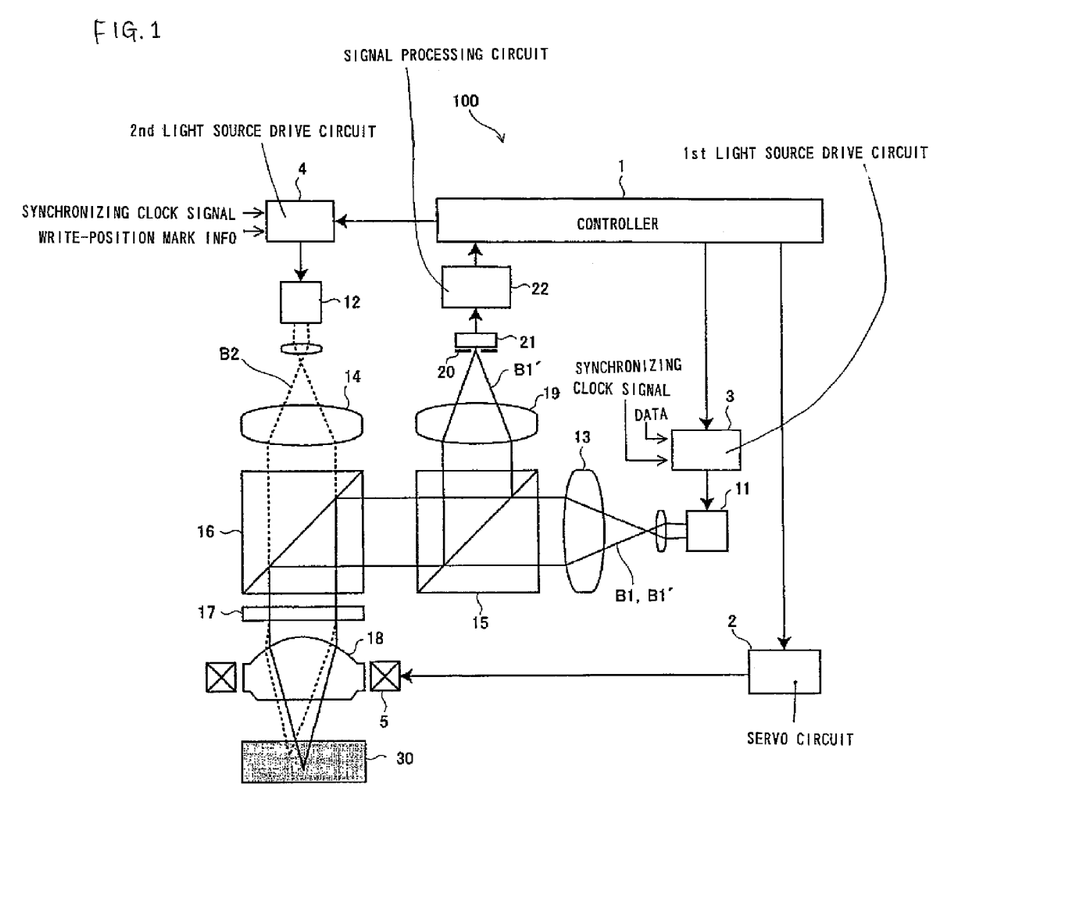
FIG. 1 is a configuration diagram schematically showing a multilayer optical recording medium recording apparatus that is an embodiment of the present invention.

FIG. 1 shows schematically the configuration of a recording apparatus 100 for multilayer optical recording media according to the present invention. The recording/reproducing apparatus 100 comprises a controller 1, a servo circuit 2, a first light source drive circuit 3, a second light source drive circuit 4, lens drive means 5, a data recording light source 11, a write-position mark recording light source 12, collimator lenses 13, 14, a beam splitter 15, a polarizing beam splitter 16, a polarizing hologram 17, an objective lens 18, a converging lens 19, a pin hole 20, a photo-detector 21, and a signal processing circuit 22. A recording medium 30 is a disc-shaped multilayer optical recording medium that the recording apparatus 100 records data.

The controller 1 is a portion that executes the main control of the recording apparatus 100 and, when recording data into the recording medium 30, supplies servo control signals to the servo circuit 2 and also an instruction to record data to the first light source drive circuit 3, and an instruction to record write-position marks to the second light source drive circuit 4.

The first light source drive circuit 3, in response to the instruction to record data from the controller 1, performs desired modulation on data to be recorded synchronously with timings according to a synchronizing clock signal and supplies a first drive signal having signal levels corresponding to a modulated record signal to the data recording light source 11. The data recording light source 11 emits a data recording beam B1 having emission intensity corresponding to the drive signal supplied from the first light source drive circuit 3. Meanwhile, the second light source drive circuit 4, in response to the instruction to record write-position marks from the controller 1, performs desired modulation on information on write-position marks to be recorded synchronously with timings according to the synchronizing clock signal and supplies a second drive signal having signal levels corresponding to a modulated record signal to the write-position mark recording light source 12.

The position mark recording light source 12 emits a position mark recording beam B2 modulated in intensity by the second light source drive circuit 4. The data recording beam B1 and the position mark recording beam B2 are different in polarization direction from each other. As such, the recording apparatus 100 comprises two light sources, the data recording light source 11 and the position mark recording light source 12, and is configured such that the emission intensities of the beams emitted from the light sources are controlled individually by the first and second light source drive circuits 3, 4. The data recording beam B1 from the data recording light source 11 is made by the collimator lens 13 to be a parallel ray bundle, which passes through the beam splitter 15 and is incident on the polarizing beam splitter 16. The data recording beam B1 reflected by the polarizing beam splitter 16 passes through the polarizing hologram 17 and is focused on a recording layer of the recording medium 30 by the objective lens 18. The data recording beam B1 causes a chemical reaction in the recording layer of the recording medium 30 made of, e.g., organic dye, thereby forming a recorded mark holding data. The portions where a recorded mark is formed are different in reflectance from the other portions, and the recorded data is reproduced based on this change in reflectance.

The data recording light source 11 is used not only for recording data but also as a light source for reading write-position marks recorded in the recording medium 30 beforehand or by the position mark recording beam B2. That is, while write-position marks recorded in the recording medium 30 are read by the data recording beam B1, data is recorded by the same beam B1. When reading write-position marks, the data recording light source 11 emits such a data recording beam that its emission intensity is controlled by the first light source drive circuit 3 to be sufficiently lower than when recording data. Hereinafter this beam is called a reading beam B1' to distinguish from the data recording beam B1. Note that the light source for reading write-position marks may be provided separate from the data recording light source. The reading beam B1' travels the same path as the data recording beam B1 and is focused on the recording medium 30. The write-position marks formed in the recording medium 30 are different in reflectance from the other portions, and by detecting this change in reflectance with the photo-detector 21, the write-position marks are read. The tracking servo and focus servo of the data recording beam B1 are achieved based on the read write-position marks as described later.

The reading beam B1' is reflected by the recording medium 30, and the return light travels the path opposite in direction to the forward path, through the objective lens 18, the polarizing hologram 17, and the polarizing beam splitter 16 to be incident on the beam splitter 15. The return light of the reading beam B1' reflected by the beam splitter 15 passes through the converging lens 19 and the pin hole 20 to be converged on the photo-detector 21. The photo-detector 21 is constituted by, e.g., a PIN photodiode and produces electrical signals according to the received light amount and supplies them to the signal processing circuit 22. The pin hole 20 provided in front of the photo-detector 21 is used to remove the crosstalk influence of recording layers adjacent to the recording layer being read by the reading beam B1'. That is, by providing the pin hole 20, the photo-detector 21 can detect only the write-position marks on the target recording layer. The signal processing circuit 22 generates a focus error signal and a tracking error signal based on the electrical signals supplied from the photo-detector 21 and supplies them to the controller 1. The controller 1 generates servo control signals to eliminate the focus error and tracking error according to the focus error signal and the tracking error signal and supplies them to the servo circuit 2. The servo circuit 2 controls the lens drive means 5 to drive according to the servo control signals such that the data recording beam B1 follows a record track in the target recording layer. Accordingly, the lens drive means 5 moves the objective lens 18 in an optical axis direction and in a radial direction of the recording medium 30 to vary the focal positions of the data recording beams B1 and B2.

Meanwhile, the position mark recording beam B2 is made by the collimator lens 14 to be a parallel ray bundle, which passes through the polarizing beam splitter 16 and is incident on the polarizing hologram 17. The axis of the position mark recording beam B2 different in polarization direction from the data recording beam B1 is deflected by the polarizing hologram 17. Namely, the axis of the position mark recording beam B2 having passed through the polarizing hologram 17 is slightly skewed with respect to the optical axis direction of the data recording beam B1. The position mark recording beam B2 having passed through the polarizing hologram 17 is focused on a recording layer of the recording medium 30 by the objective lens 18. Namely, the data recording beam B1 and the position mark recording beam B2 are focused by the common objective lens 18 and polarizing hologram 17 on different locations in a thickness direction of the recording medium 30, i.e. the optical axis direction, and in a disc radial direction. The position mark recording beam B2 causes a chemical reaction in the recording layer of the recording medium 30, thereby forming a recorded mark, a groove, a wobble, a pre-pit, or the like as a write-position mark. In FIG. 1, the data recording beam B1 and the reading beam B1' are indicated by solid lines, and the position mark recording beam B2 is indicated by broken lines.

Figure 2A:
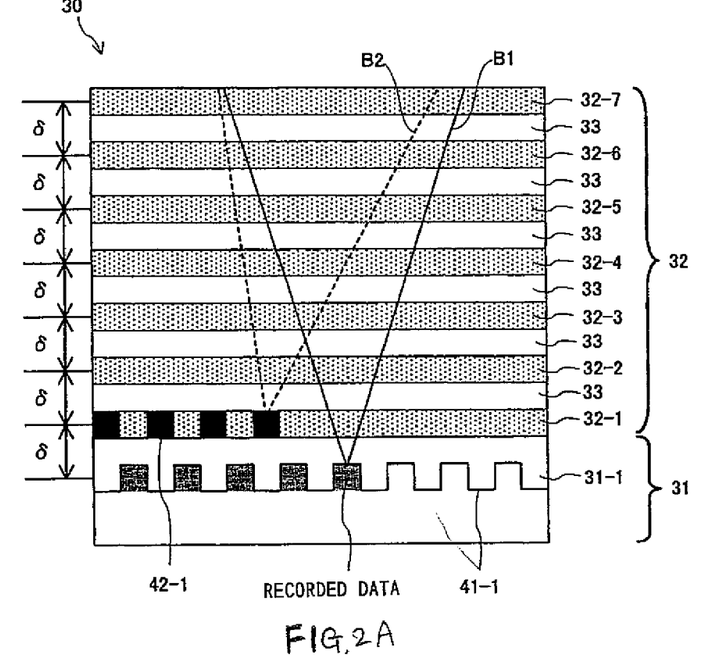
FIGS. 2A and 2B are cross-sectional diagrams of a recording medium showing a recording method that is an embodiment of the present invention.
Figure 2B:
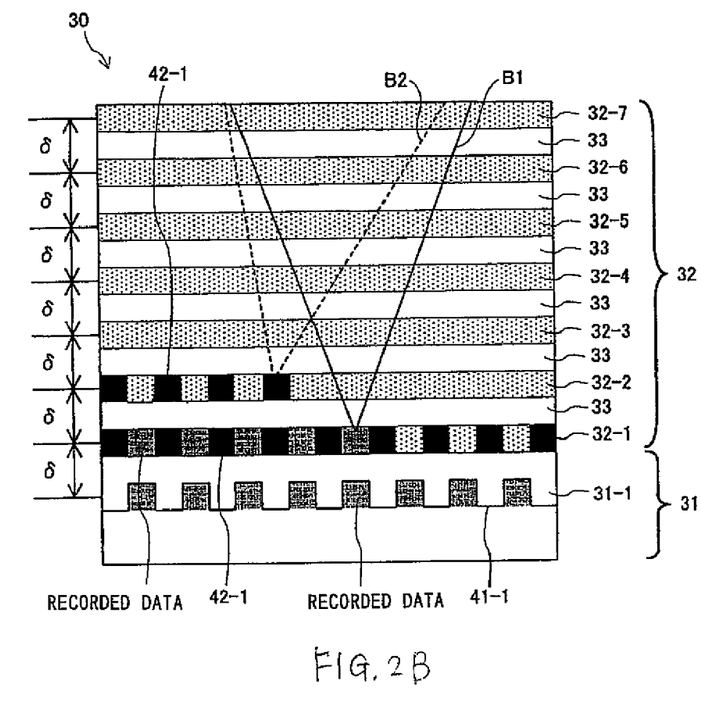

The method of recording data and write-position marks into the recording medium 30 by the recording apparatus 100 having the above configuration will be described with reference to FIGS. 2A and 2B. FIGS. 2A and 2B are illustrative diagrams of the recording method according to the present embodiment and show the cross-section structure of the recording medium 30. The recording medium 30 has a first record area 31 where write-position marks 41-1 including information necessary for tracking and focusing and address information are recorded beforehand and a second record area 32 where no write-position mark is recorded. That is, in the first record area 31, for example, a groove, a wobble, or pre-pits are formed as write-position marks beforehand. For recording media where no write-position mark 41 is formed beforehand, write-position marks 41 may be formed by focusing the position mark recording beam B2 on predetermined locations.

The first record area 31 and the second record area 32 comprise recording material made of, e.g., azo-based organic dye, and regions formed of this recording material are recording layers. The organic dye chemically changes due to the irradiation of the data recording beam B1 or the position mark recording beam B2, thus changing in reflectance. Data and write-position marks are read based on this change in reflectance. Other than the organic dye, phase change material comprising, e.g., indium, antimony, and the like may be used as the recording material. As shown in FIGS. 2A and 2B, only a recording layer 31-1 is formed in the first record area 31, and the write-position marks 41-1 are recorded in the recording layer 31-1. In contrast, in the second record area 32, a plurality of recording layers 32-1, 32-2, 32-3, . . . are laid one over another with a spacer layer 33 in between and the centers of adjacent layers being a distance δ apart.

Recording data into the recording medium 30 having this structure starts at the recording layer 31-1 of the first record area 31 where write-position marks 41-1 are recorded beforehand as shown in FIG. 2A. The reading beam B1' emitted from the data recording light source 11 is projected onto write-position marks 41-1 recorded in the recording medium 30 beforehand, and servo control is performed such that the focal point of the data recording beam B1 follows the record track of the recording layer 31-1 denoted by the write-position marks 41-1. Then, by irradiating the data recording beam B1 of emission intensity corresponding to data to be recorded onto the recording layer 31-1, recorded marks are formed, thereby recording data. At this time, the position mark recording beam B2 is focused on a surface which is the distance δ away along the optical axis direction toward the objective lens from the recording surface of the recording layer 31-1, that is, the recording surface of the recording layer 32-1 in the second record area 32. Namely, the recording apparatus 100 is adjusted such that as the data recording beam B1 is focused on the recording surface of the recording layer 31-1, the position mark recording beam B2 is focused on the recording surface of the recording layer 32-1. As such, the distance between the focal points of the data recording beam B1 and the position mark recording beam B2 is kept constant, and the distance in an optical axis direction coincides with the distance δ between the recording surfaces of adjacent recording layers of the recording medium 30. As the data recording beam B1 records data onto the recording layer 31-1, the position mark recording beam B2 records new write-position marks 42-1 onto the recording layer 32-1. When recording data onto the recording layer 31-1 by the data recording beam B1 finishes, recording write-position marks 42-1 onto the recording layer 32-1 by the position mark recording beam B2 also finishes.

Subsequently, as shown in FIG. 2B, the focal position of the data recording beam B1 is moved onto the recording layer 32-1 to record data onto the recording layer 32-1. Then, the reading beam B1' is projected onto the write-position marks 42-1 newly formed by the position mark recording beam B2, and by reading them, servo control is performed. Tracking control is performed such that the focal point of the data recording beam B1 follows the record track of the recording layer 32-1 denoted by the write-position marks 42-1 with recording data onto the recording layer 32-1.

Figure 3A:
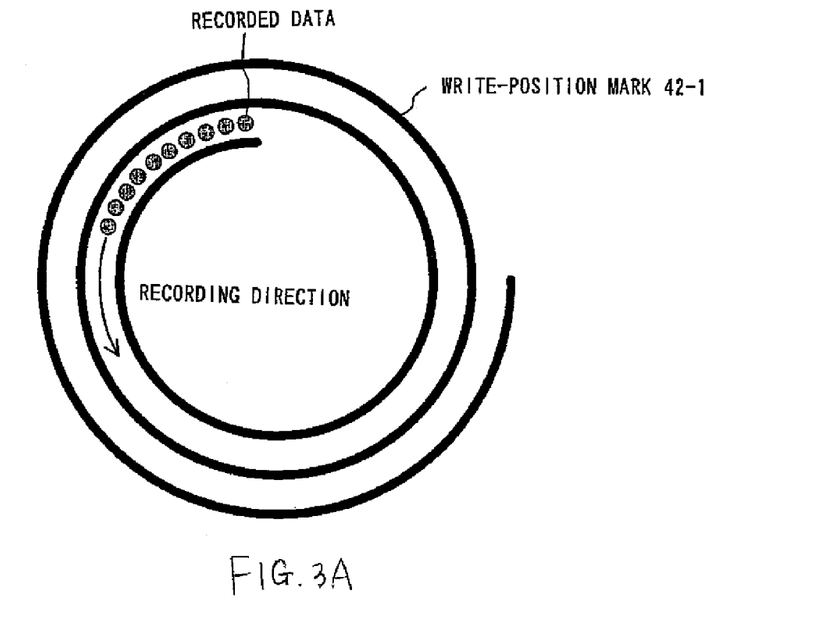
FIGS. 3A and 3B are top plan views of the recording medium showing the recording method that is an embodiment of the present invention.

FIGS. 3A and 3B show the way that the data recording beam B1 sequentially records data based on the write-position marks 42-1 recorded on the recording layer 32-1 by the position mark recording beam B2, as the recording layer 32-1 is viewed from above. As shown in FIG. 3A, a write-position mark 42-1 constituted by a recorded mark, a groove, or the like extending in a spiral from the inner circumference side to the outer circumference side of the recording medium 30 is formed on the recording layer 32-1 by the position mark recording beam B2. This write-position mark guides along a record track when the data recording beam B1 records data onto this recording layer and also includes address information indicating positions on this recording layer. While reading the write-position mark in this form, the data recording beam B1 records data in between adjacent write-position mark turns along the write-position mark with going from the inner circumference side to the outer circumference side of the recording medium 30. That is, in this case, recorded data is sandwiched by write-position marks in a radial direction of the recording medium 30 (a disc radius direction).

Figure 3B:
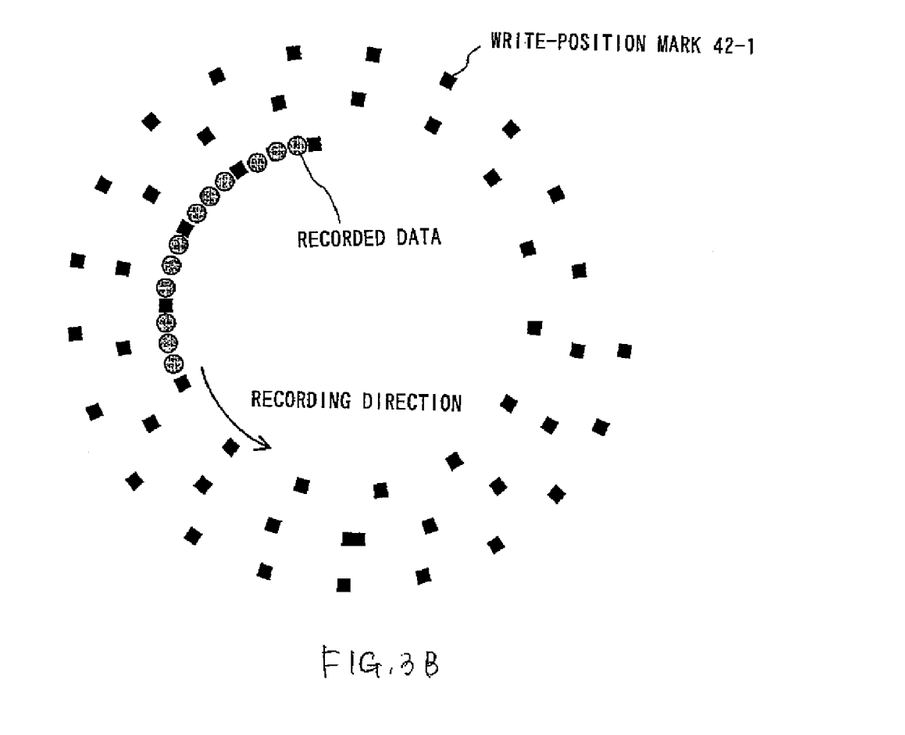

In contrast, FIG. 3B shows another form of recording. As shown in the figure, write-position marks 42-1 formed by the position mark recording beam B2 may be constituted by multiple pits or recorded marks arranged in a spiral from the inner circumference side to the outer circumference side of the recording medium 30. The data recording beam B1 records data in between the pits while reading the write-position marks recorded in this form. That is, in this case, recorded data is sandwiched by write-position marks in a tangential direction of the recording medium 30 (a disc rotation direction).

When the focal position of the data recording beam B1 is located on the recording layer 32-1, the position mark recording beam B2 is focused on a surface which is the distance δ away along the optical axis direction toward the objective lens from the recording surface of the recording layer 32-1, that is, the recording layer 32-2. As the data recording beam B1 records data onto the recording layer 32-1, the position mark recording beam B2 records new write-position marks 42-2 onto the recording layer 32-2. The recording apparatus 100, by repeating the above operation, records data three-dimensionally onto the recording layers of the recording medium 30, while recording write-position marks. At this time, the data recording beam B1 is servo-controlled based on the write-position marks formed on a recording layer by the position mark recording beam B2 to sequentially record data onto this recording layer.

Figure 4:
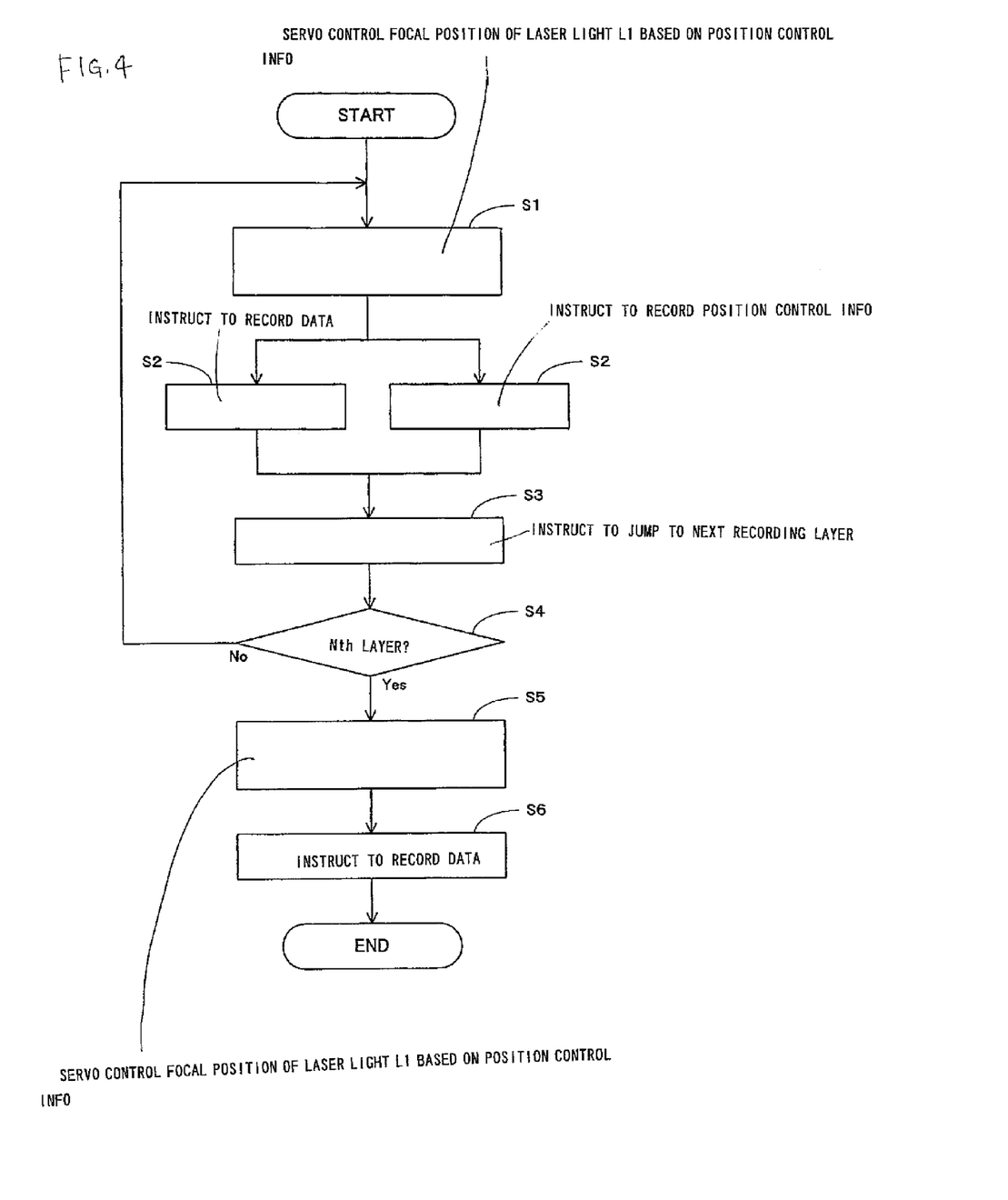
FIG. 4 is a cross-sectional diagram of a recording medium showing the recording method that is an embodiment of the present invention.

Although the above embodiment describes the structure where in the second record area 32 the plurality of recording layers 32-1, 32-2, . . . are laid one over another apart from each other with the spacer layer 33 in between, as in a recording medium 30b shown in FIG. 4, the first and second record areas may be formed only of recording material and thus be a bulk. That is, even without the spacer layers 33 between the recording layers in the second record area 32, data can be recorded three-dimensionally in the record area by the recording method of the present invention.

Figure 5:
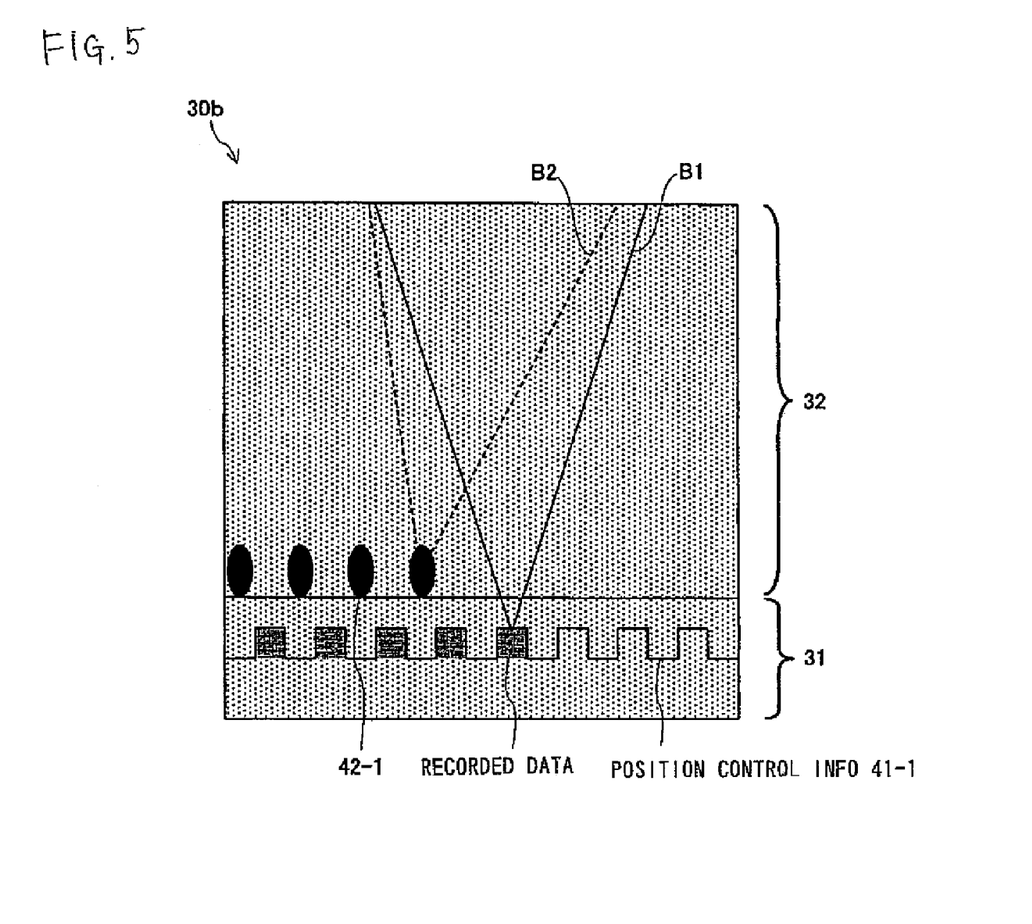
FIG. 5 is a flow chart showing the operation of a recording apparatus that is an embodiment of the present invention.

The operation of the recording apparatus 100 when recording data and write-position marks into the recording medium 30 having N number of recording layers by the recording method described above will be described with reference to the flow chart of FIG. 5. This operation flow is implemented by the controller 1 that executes the main control of the recording apparatus 100.

First, the controller 1 servo-controls the focal position of the data recording beam B1 based on the write-position marks 41-1 provided in the first record area 31 of the recording medium 30 beforehand. Specifically, the controller 1 irradiates the reading beam B1' whose emission intensity is adjusted to be sufficiently lower than when recording data, into the recording medium 30 to read the write-position marks 41-1. Then, the signal processing circuit 22 generates the focus error signal and the tracking error signal based on electrical signals obtained by receiving the return light that is the reading beam B1' reflected by the recording medium 30 with the photo-detector 21 and supplies them to the controller 1. The controller 1 supplies the servo circuit 2 with servo control signals according to the focus error signal and the tracking error signal supplied from the signal processing circuit 22. The servo circuit 2 supplies the lens drive means 5 with drive signals according to the servo control signals to move the objective lens 18 in an optical axis direction and in a track direction, thereby performing the servo control such that the focal point of the data recording beam B1 follows the record track of the recording layer 31 (step S1). At this time, the position mark recording beam B2 is not irradiated into the recording medium 30, but the optical system is adjusted such that the position mark recording beam B2 is focused on the recording layer 32-1.

Next, the controller 1 supplies an instruction to record data to the first light source drive circuit 3, and an instruction to record write-position marks to the second light source drive circuit 4 (step S2). In response to the record instruction, the first light source drive circuit 3 performs modulation on data to be recorded and supplies a drive signal having signal levels corresponding to a modulated record signal to the data recording light source 11. The data recording light source 11 emits the data recording beam B1 having emission intensity corresponding to this drive signal, which beam is projected onto the recording layer 31 to record data. Meanwhile, the second light source drive circuit 4 supplies a drive signal having signal levels corresponding to write-position marks to be recorded to the write-position mark recording light source 12. The write-position mark recording light source 12 emits the position mark recording beam B2 having emission intensity corresponding to this drive signal, which beam is projected onto the recording layer 32-1 to record write-position marks.

When recording data onto the recording layer 31-1 and recording write-position marks onto the recording layer 32-1 are finished, the controller 1 issues a jump instruction to the servo circuit 2 to make the focal point of the data recording beam B1 move onto the recording layer 32-1 (step S3).

Then, the controller 1 determines whether the jump destination for the focal point of the data recording beam B1 is the Nth recording layer (step S4). That is, at this step, it is determined whether the jump destination recording layer is the last recording layer of the recording medium 30 having the N number of recording layers. Information on the number of recording layers of the recording medium 30 is recorded in, e.g., the recording medium 30 beforehand, and the controller 1 reads this to realize the number N of recording layers and makes a determination at step S4.

If at step S4 it is determined that the jump destination recording layer is not the Nth recording layer, i.e., the last recording layer of the recording medium 30 (step S4: No), then the operation returns to the process of step S1, where the data recording beam B1 is servo-controlled based on the write-position marks recorded on the jump destination recording layer by the position mark recording beam B2 to record data onto this recording layer, while recording, by the position mark recording beam B2, write-position marks onto the recording layer where to record data subsequent to this recording layer.

On the other hand, if at step S4 it is determined that the jump destination recording layer is the Nth recording layer, i.e., the last recording layer of the recording medium 30 (step S4: Yes), then the controller 1 servo-controls the data recording beam B1 based on the write-position marks recorded on this jump destination recording layer by the position mark recording beam B2 (step S5) and gives an instruction to record data to the first light source drive circuit 3 (step S6). By this means, servo control is performed such that the focal point of the data recording beam B1 follows the record track of the Nth recording layer for the data recording beam B1 to record data onto the Nth recording layer. With the Nth layer being the last recording layer of the recording medium 30, write-position marks need not be recorded, and hence the controller 1 does not issue an instruction to record write-position marks.

As such, in the present invention, a beam is focused on a desired recording layer in the recording medium to record data and write-position marks three-dimensionally. In this three-dimensional recording, a nonlinear phenomenon, for example, two-photon absorption can be used. The two-photon absorption refers to a phenomenon in which a molecule absorbs two photons simultaneously, resulting in an electron being excited from a ground state to an excited state. Meanwhile, one-photon absorption refers to a phenomenon in which a molecule absorbs one photon and is excited. The one-photon absorption occurs proportional to the light intensity, whereas the two-photon absorption occurs proportional to the square of the light intensity. Further, in the two-photon absorption, because two photons impart energy to excite an electron, light of a wavelength twice the one-photon absorption wavelength is used. For example, it is assumed that the recording material of the recording medium 30 absorbs a wavelength of around 400 nm thereby becoming active to cause a chemical change, so that a recorded mark is formed. In the case of recording data by the one-photon absorption, because a light source of a wavelength of 400 nm is used, when trying to form a recorded mark on a recording layer in the recording medium, absorption occurs on the near side of the focal point, and thus it is difficult to execute local three-dimensional recording or to form a recorded mark deep in the medium. In contrast, in the method of recording by the two-photon absorption, because a light source of a wavelength of 800 nm twice the one-photon absorption wavelength is used, absorption does not occur on the near side of the focal point, and molecules absorb energy equivalent to that of a 400 nm wavelength in and around the focal point where photon density is high. Hence, it is possible to execute local three-dimensional recording or to form a recorded mark deep in the medium. Recording by the two-photon absorption requires a light source which generates high peak power. Accordingly, in the case of recording by the two-photon absorption, for example, a femtosecond pulse laser such as a titanium sapphire laser or the like is preferably used as the data recording light source 11 and the position mark recording light source 12.

As obvious from the above description, in the recording method of the present invention, as data is recorded, write-position marks are recorded onto the recording layer where to record data subsequently. Hence, write-position marks need not be recorded beforehand on each recording layer of multilayer optical recording media having two or more recording layers. That is, even in multilayer optical recording media which do not have write-position marks on each recording layer beforehand, data can be recorded three-dimensionally. Further, since write-position marks are recorded as data is recorded, an increase in recording time can be avoided. Yet further, the distance between the focal points of the data recording beam B1 and the position mark recording beam B2 is adjusted and kept constant so as to coincide with the distance between the recording surfaces of the recording medium. Hence, a mechanism to vary the distance between the focal points of these two beams is not necessary. Moreover, because the data recording beam B1 is servo-controlled based on write-position marks formed on the same layer where to record data, more accurate servo-control can be performed as compared with the conventional method where servo-control is performed based on write-position marks formed on a layer other than a layer where to record data.

Embodiment 2

Figure 6A:
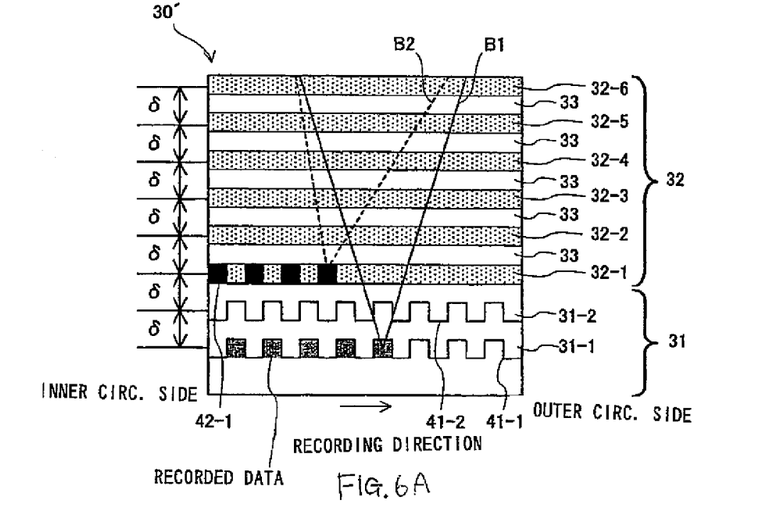
FIG. 6A shows a cross-sectional diagram.

The recording method according to a second embodiment of the present invention will be described with reference to FIGS. 6A-6C and 7A-7C. FIGS. 6A-6C and 7A-7C are illustrative diagrams of the recording method according to the present embodiment, and FIG. 6A and FIG. 7A show the cross-section structure of a recording medium 30'. The recording medium 30', as in the first embodiment, has a first record area 31 where write-position marks including information necessary for tracking and focusing and address information are recorded beforehand and a second record area 32 where no write-position mark is recorded. The first record area 31 and the second record area 32 comprise recording material made of, e.g., azo-based organic dye, and regions formed of this recording material are recording layers. Other than the organic dye, phase change material comprising, e.g., indium, antimony, and the like may be used as the recording material. The first record area 31 has recording layers 31-1, 31-2 formed a distance δ apart, and write-position marks 41-1 and 41-2 are recorded respectively on these recording layers beforehand. In contrast, in the second record area 32, a plurality of recording layers 32-1, 32-2, 32-3, 32-4, are formed one over another with a spacer layer 33 in between and the centers of adjacent layers being the distance δ apart.

Recording data into the recording medium 30' having this structure starts at the recording layer 31-1 of the first record area 31 as shown in FIG. 6A. By the reading beam B1' irradiated from the recording apparatus 100, the write-position mark 41-1 recorded on the recording layer 31-1 beforehand is read, and based on this, the focal point of the data recording beam B1 is servo-controlled to follow the record track of the recording layer 31-1 indicated by the write-position mark 41-1. Then, by irradiating the data recording beam B1 of emission intensity corresponding to data to be recorded onto the recording layer 31-1, data is recorded.

Figure 6B:
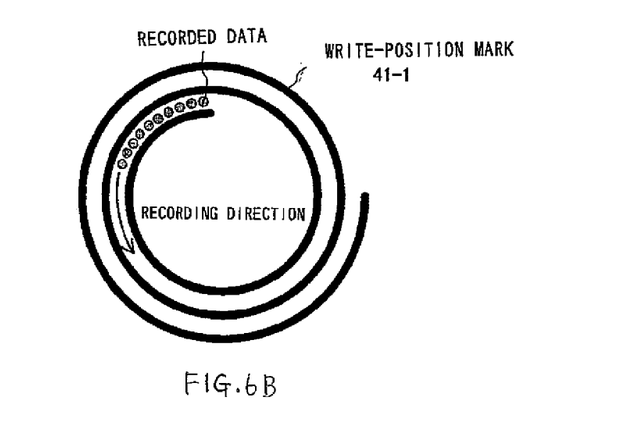
FIGS. 6B and 6C are top plan views of a recording medium showing a recording method that is another embodiment of the present invention.
Figure 6C:
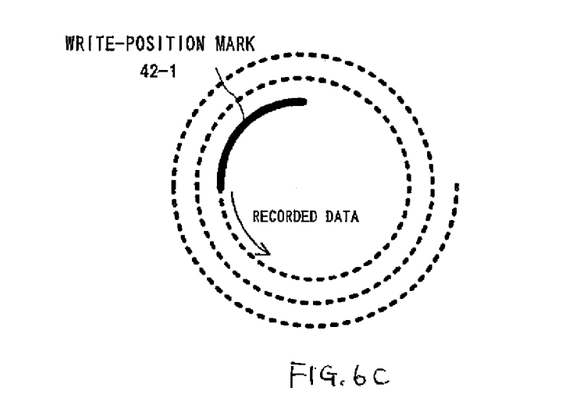
Figure 7A:
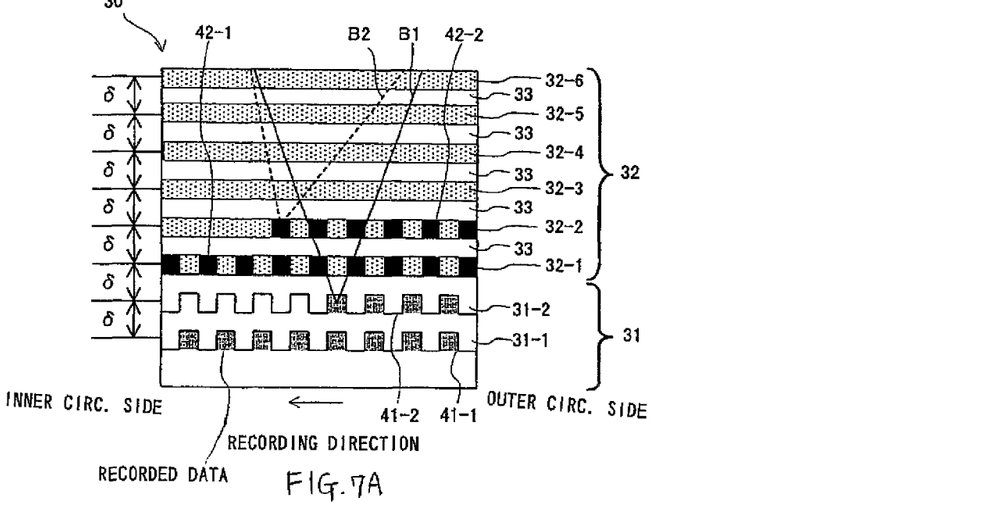
FIG. 7A shows a cross-sectional diagram.

FIG. 6B shows the way that the data recording beam B1 sequentially records data onto the recording layer 32-1 based on the write-position mark 41-1, as the recording layer 31-1 is viewed from above. The data recording beam B1 records data onto the recording layer 31-1 along the write-position mark 41-1 constituted by a groove or the like extending in a spiral from the inner circumference side to the outer circumference side of the recording medium with going from the disc inner circumference side to the outer circumference side (i.e., in the normal spiral direction). At this time, the position mark recording beam B2 is focused on a surface which is a distance 2δ away along the optical axis direction toward the objective lens from the recording surface of the recording layer 31-1, that is, the recording surface of the recording layer 32-1 in the second record area 32. That is, the optical system of the recording apparatus 100 is adjusted such that as the data recording beam B1 is focused on the recording layer 31-1, the position mark recording beam B2 is focused on the recording surface of the recording layer 32-1 that is the distance 2δ away along the optical axis direction. As such, the distance between the focal points of the data recording beam B1 and the position mark recording beam B2 is kept constant, and the inter-focal-point distance in an optical axis direction coincides with twice the distance between adjacent recording surfaces of the recording medium 30, i.e., 2δ. Then, as the data recording beam B1 records data onto the recording layer 31-1, the position mark recording beam B2, going along, records a new write-position mark 42-1 onto the recording layer 32-1. FIG. 6C shows the way that the position mark recording beam B2, going along, records the write-position mark 42-1 onto the recording layer 32-1, as the recording layer 32-1 is viewed from above. As shown in FIG. 6C, the position mark recording beam B2 records the write-position mark 41-1 constituted by a recorded mark, a groove, or the like extending in a spiral onto the recording layer 32-1 with going from the disc inner circumference side to the outer circumference side (i.e., in the normal spiral direction). Note that in FIG. 6C the solid line segment indicates an already recorded region of the write-position mark and the dotted line segment indicates a non-recorded region (to be recorded). When recording data onto the recording layer 31-1 by the data recording beam B1 finishes, recording the write-position mark 42-1 onto the recording layer 32-1 by the position mark recording beam B2 also finishes.

Figure 7B:
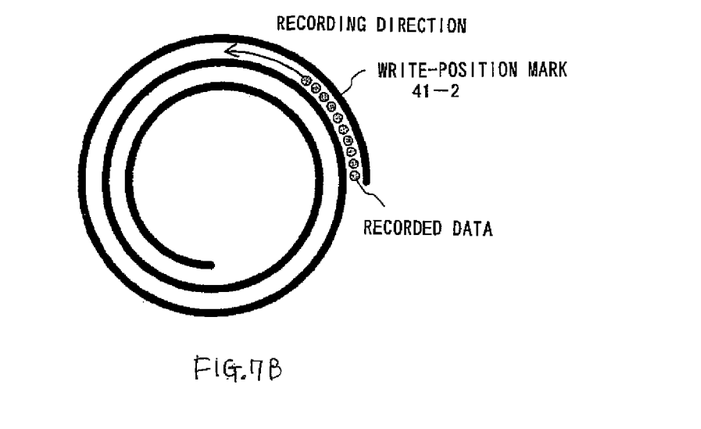
FIGS. 7B and 7C are top plan views of the recording medium showing the recording method that is the other embodiment of the present invention.
Figure 7C:
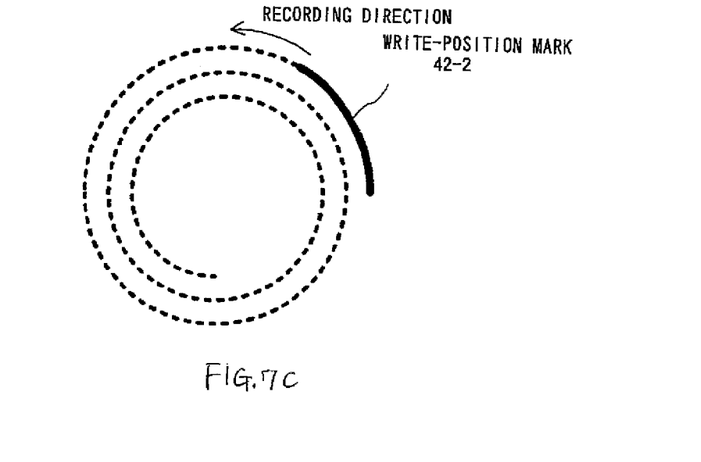

Subsequently, as shown in FIG. 7A, the focal position of the data recording beam B1 is moved onto the recording layer 31-2 to record data onto the recording layer 31-2. Then, the reading beam B1' is projected onto the write-position mark 41-2 recorded on the recording layer 31-2 beforehand to read this, thereby performing the servo-control. The data recording beam B1 is tracking-controlled to follow the record track of the recording layer 31-2 indicated by the write-position mark 41-2 to record data onto the recording layer 31-2. FIG. 7B shows the way that the data recording beam B1 sequentially records data onto the recording layer 31-2 based on the write-position mark 41-2, as the recording layer 31-2 is viewed from above. As shown in FIG. 7B, the data recording beam B1 records data onto the recording layer 31-2 along the write-position mark 41-2 constituted by, e.g., a groove or the like extending in a spiral from the outer circumference side to the inner circumference side of the recording medium with going from the disc outer circumference side to the inner circumference side (i.e., in the reverse spiral direction). At this time, the position mark recording beam B2 is focused on a surface which is the distance 2δ away along the optical axis direction toward the objective lens from the recording surface of the recording layer 31-2, that is, the recording surface of the recording layer 32-2. Then, as the data recording beam B1 records data onto the recording layer 31-2, the position mark recording beam B2, going along, records a new write-position mark 42-2 onto the recording layer 32-2. FIG. 7C shows the way that the position mark recording beam B2, going along, records the write-position mark 42-2 onto the recording layer 32-2, as the recording layer 32-2 is viewed from above. As shown in FIG. 7C, the position mark recording beam B2 records the write-position mark 41-2 extending in a spiral onto the recording layer 32-2 with going from the disc outer circumference side to the inner circumference side (i.e., in the reverse spiral direction). Note that in FIG. 7C the solid line segment indicates an already recorded region of the write-position mark and the dotted line segment indicates a non-recorded region (to be recorded). When recording data onto the recording layer 31-2 by the data recording beam B1 finishes, recording the write-position mark 42-2 onto the recording layer 32-2 by the position mark recording beam B2 also finishes.

Subsequently, the focal position of the data recording beam B1 is moved onto the recording layer 32-1 to record data onto the recording layer 32-1. Then, the reading beam B1' is projected onto the write-position mark 42-1 newly formed by the position mark recording beam B2, and based on this, servo-control is performed. The data recording beam B1 is tracking-controlled to follow the record track of the recording layer 32-1 indicated by the write-position mark 42-1 to record data onto the recording layer 32-1. The data recording beam B1 records data onto the recording layer 32-1 along the write-position mark with going from the disc inner circumference side to the outer circumference side (i.e., in the normal spiral direction). At this time, the position mark recording beam B2 is focused on a surface which is the distance 2δ away along the optical axis direction toward the objective lens from the recording surface of the recording layer 32-1, that is, the recording surface of the recording layer 32-3 in the second record area. Then, as the data recording beam B1 records data onto the recording layer 32-1, the position mark recording beam B2 records a new write-position mark 42-3 onto the recording layer 32-3 with going from the disc inner circumference side to the outer circumference side (i.e., in the normal spiral direction). When recording data onto the recording layer 32-1 by the data recording beam B1 finishes, recording the write-position mark 41-3 onto the recording layer 32-3 by the position mark recording beam B2 also finishes.

Subsequently, the focal position of the data recording beam B1 is moved onto the recording layer 32-2 to record data onto the recording layer 32-2. Then, by the reading beam B1', the write-position mark 42-2 newly formed by the position mark recording beam B2 is read, and based on this, servo-control is performed. The data recording beam B1 is tracking-controlled to follow the record track of the recording layer 32-2 indicated by the write-position mark 42-2 to record data onto the recording layer 32-2. The data recording beam B1 records data onto the recording layer 32-2 along the write-position mark with going from the disc outer circumference side to the inner circumference side (i.e., in the reverse spiral direction). At this time, the position mark recording beam B2 is focused on a surface which is the distance 2δ away along the optical axis direction toward the objective lens from the recording surface of the recording layer 32-2, that is, the recording surface of the recording layer 32-4. Then, as the data recording beam B1 records data onto the recording layer 32-2, the position mark recording beam B2 records a new write-position mark onto the recording layer 32-4 with going from the disc outer circumference side to the inner circumference side (i.e., in the reverse spiral direction). When recording data onto the recording layer 32-2 by the data recording beam B1 finishes, recording the write-position mark onto the recording layer 32-4 by the position mark recording beam B2 also finishes. By repeating the above operation, data is recorded three-dimensionally in the recording medium 30'.

As such, the recording method according to the second embodiment, for each recording layer, switches the recording direction between the normal spiral direction and the reverse spiral direction and, going along, records data and a write-position mark. That is, in the recording medium 30' recorded into by the recording method according to the present embodiment, recording layers having data and a write-position mark recorded in the normal spiral direction alternate with recording layers having data and a write-position mark recorded in the reverse spiral direction. By this means, also when data is recorded into recording media using a record format called a so-called opposite track path scheme, where write-position marks recorded in the normal spiral direction and in the reverse spiral direction are laid one over the other alternately, data can be recorded three-dimensionally.

Embodiment 3

Figure 8A:
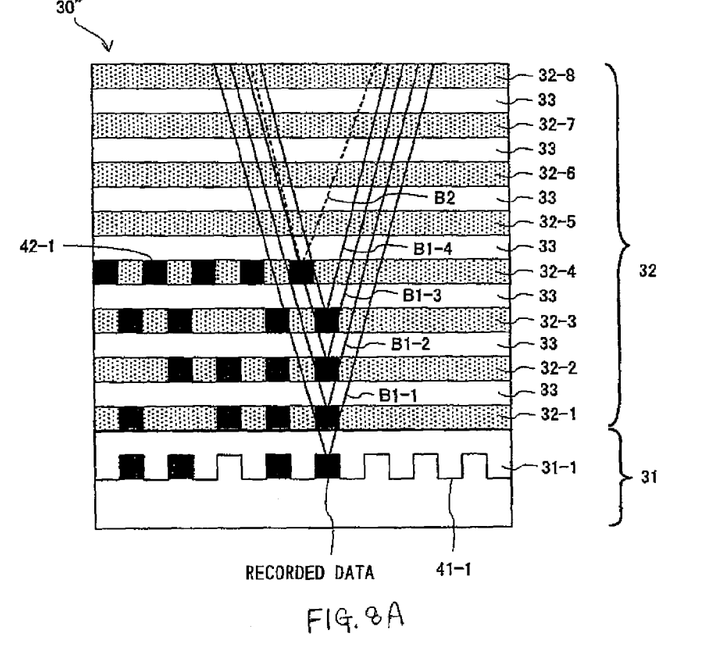
FIGS. 8A and 8B are cross-sectional diagrams of a recording medium showing a recording method that is another embodiment of the present invention.
Figure 8B:
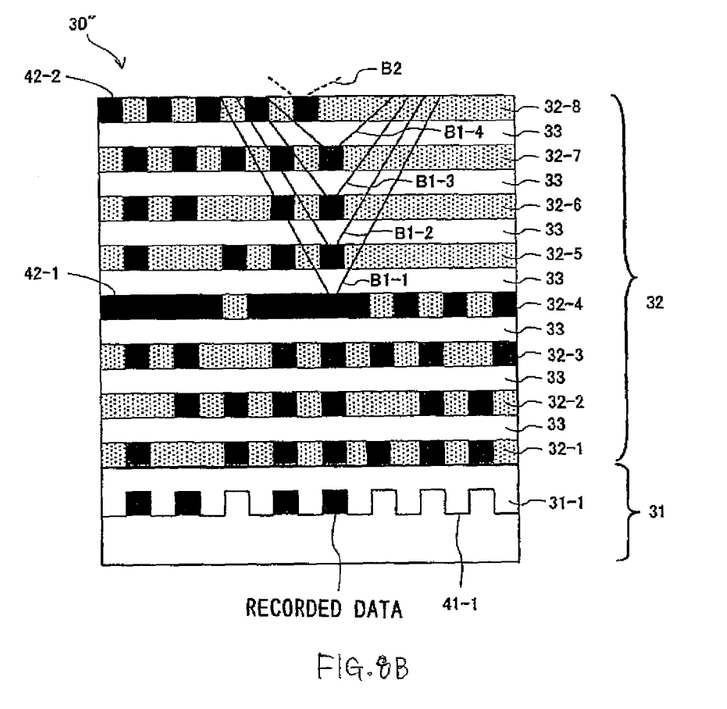

The recording method according to a third embodiment of the present invention will be described with reference to FIGS. 8A and 8B. FIGS. 8A and 8B are illustrative diagrams of the recording method according to the present embodiment and show the cross-section structure of a recording medium 30". The recording medium 30N, as in the first and second embodiments, has a first record area 31 where write-position marks including information necessary for tracking and focusing and address information are recorded beforehand and a second record area 32 where no write-position mark is recorded. The first record area 31 and the second record area 32 comprise recording material made of, e.g., azo-based organic dye, and regions formed of this recording material are recording layers. Other than the organic dye, phase change material comprising, e.g., indium, antimony, and the like may be used as the recording material. The first record area 31 has at least one recording layer 31-1, on which the previously-mentioned write-position mark 41-1 is recorded. In contrast, in the second record area 32, a plurality of recording layers 32-1, 32-2, 32-3, . . . are formed one over another with a spacer layer 33 in between and the centers of adjacent layers being the distance δ apart.

Recording data into the recording medium 30" having this structure is performed by simultaneously irradiating, e.g., four data recording beams B1-1 to B1-4 onto different recording layers respectively as shown in FIGS. 8A and 8B.

A recording apparatus for implementing the recording method according to the present embodiment is configured with a corresponding number of additional data recording light sources 11 and first light source drive circuits 3 to the number of additional data recording beams as well as the recording apparatus 100 in FIG. 1. The first light source drive circuits each perform desired modulation on data to be recorded onto a respective recording layer to generate a drive signal having signal levels corresponding to a modulated record signal and supply this to a respective data recording light source. Each data recording light source emits a data recording beam having emission intensity corresponding to the drive signal supplied from the corresponding first light source drive circuit. These multiple data recording beams are focused on different recording layers of the recording medium 30" respectively to record data onto these recording layers simultaneously. That is, because data to be recorded is different for each recording layer, each first light source drive circuit generates a different drive signal, and each data recording light source emit a data recording beam modulated in intensity differently according to the corresponding drive signal.

As shown in FIG. 8A, the focal position of the first data recording beam B1-1 is moved onto the recording layer 31-1 to record data onto the recording layer 31-1. Then, the reading beam B1' from the corresponding light source is projected onto the write-position mark 41-1 recorded on the recording layer 31-1 beforehand, and based on this, servo-control is performed. The data recording beam B1-1 is servo-controlled to follow the record track of the recording layer 31-1 indicated by the write-position mark 41-1 to sequentially record data onto the recording layer 31-1.

At this time, the second data recording beam B1-2 is focused on the recording surface of the recording layer 32-1 that is the distance δ away from the recording surface of the recording layer 31-1. The third data recording beam B1-3 is focused on the recording surface of the recording layer 32-2 that is formed the distance δ away from the recording surface of the recording layer 32-1. And the fourth data recording beam B1-4 is focused on the recording surface of the recording layer 32-3 that is formed the distance δ away from the recording surface of the recording layer 32-2. Further, the position mark recording beam B2 is focused on the recording surface of the recording layer 32-4 that is formed the distance δ away from the recording surface of the recording layer 32-3. That is, the distances between the focal positions of the data recording beams B1-1 to B1-4 and the position mark recording beam B2 are kept constant, and the optical system is adjusted such that the inter-focal-point distances in an optical axis direction of the data recording beams B1-1 and B1-2, B1-2 and B1-3, B1-3 and B1-4, and B1-4 and B2 coincide with the distance δ between adjacent recording surfaces of the recording medium 30". Then, as the data recording beam B1-1 is servo-controlled based on the write-position mark 41-1 to record data onto the recording layer 31-1, the data recording beams B1-2 to B1-4 sequentially record data onto the recording layers 32-1 to 32-3, where no write-position mark is recorded.

That is, as servo-control is performed based on the write-position mark recorded on one recording layer using one of multiple data recording beams to record data onto this recording layer, the other data recording beams are respectively focused on different recording layers in the recording medium 30" also to record data onto the recording layers simultaneously, where no write-position mark is recorded. Although in the above embodiment servo-control is performed based on the write-position mark formed on the recording layer 31-1 beforehand, the write-position mark may be formed on another recording layer (32-1 to 32-3), and based on this, servo-control may be performed. Moreover, the number of data recording beams can be changed as needed.

While the data recording beams record data respectively onto the recording layers, the position mark recording beam B2 records a new write-position mark 42-1 onto the recording layer 32-4. When recording data onto the recording layers 31-1 to 32-3 by the data recording beams B1-1 to B1-4 is finished, recording the write-position mark 42-1 onto the recording layer 32-4 by the position mark recording beam B2 is also finished.

Subsequently, as shown in FIG. 8B, the focal position of the data recording beam B1-1 is moved onto the recording layer 32-4 to record data onto the recording layer 32-4. Then, based on the write-position mark 42-1 newly formed by the position mark recording beam B2, servo-control is performed. The data recording beam B1-1 is tracking-controlled to follow the record track of the recording layer 32-4 indicated by the write-position mark 42-1 to record data onto the recording layer 32-4. At the same time as this, the data recording beams B1-2 to B1-4 are focused respectively on the recording layers 32-5 to 32-7 to sequentially record data onto these recording layers. Further, the position mark recording beam B2 is focused on the recording layer 32-8 to record, going along, a new write-position mark onto this recording layer.

In the recording medium 30" recorded into by this recording method, one or more recording layers having only data recorded thereon without a write-position mark are formed in between recording layers having both a write-position mark and data recorded thereon.

Although in the above embodiment the write-position mark 42-1 is recorded onto the recording layer 32-4 by the position mark recording beam B2 and the data recording beam B1-1 reads this, the write-position mark 42-1 may be recorded onto another recording layer. For example, the write-position mark 42-1 may be recorded onto the recording layer 32-6, and this may be read by the data recording beam B1-3 to perform servo-control.

As such, in the above embodiment, with multiple data recording beams being used, while servo-control is performed with one of them, data is recorded onto a plurality of recording layers simultaneously, and thus, recording time can be reduced. Also in this case, at the same time that data is recorded, the write-position mark is recorded by the position mark recording beam, and hence, write-position marks for a plurality of recording layers need not be formed in the recording medium beforehand.

Figure 9A:
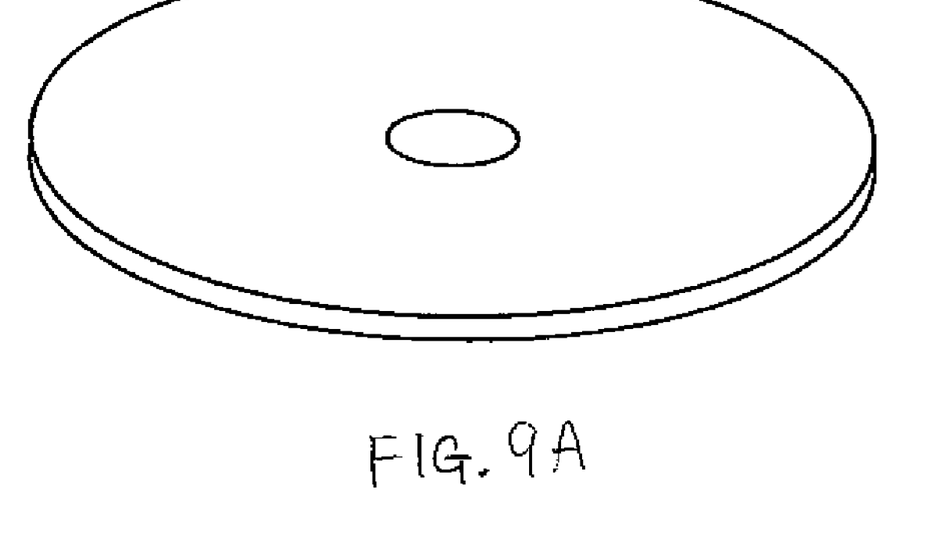
FIGS. 9A and 9B are perspective view showing the form of a recording medium of the present invention.
Figure 9B:
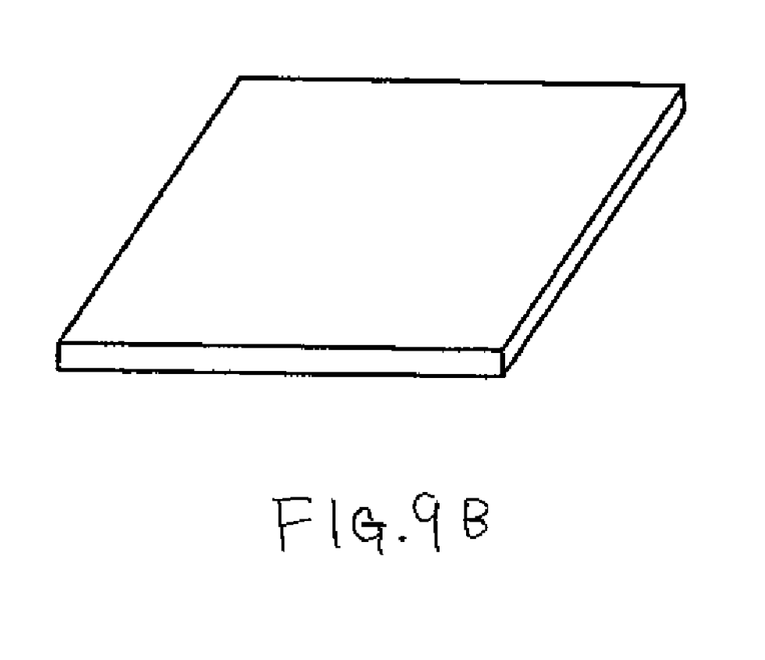

Although in the above embodiments multilayer optical recording media have a disc shape as shown in FIG. 9A, not being limited to this, the media may be in the form of an optical card shaped like a rectangular parallel plate as shown in FIG. 9B, for example.

The invention claimed is:

1. A fabrication method of a multilayer optical recording medium having a plurality of recording layers, comprising: a write-position mark forming step of forming write-position marks in a record area of said multilayer optical recording medium; a step of preparing an optical system including a common objective lens to focus a data recording beam and a position mark recording beam on different positions in a thickness direction of said record area; a first data writing step of writing data in a first recording layer of said plurality of recording layers between said write-position marks with following said write-position marks by said data recording beam focused by said optical system; and a position mark recording step of, recording new write-position marks in a second recording layer of said plurality of recording layers as data is written in said first recording layer which is in a different position from said second recording layer in said thickness direction of said record area by said position mark recording beam focused by said optical system.

2. A fabrication method of a multilayer optical recording medium having a plurality of recording layers, at least one of which has write-position marks, comprising: a step of preparing an optical system including a common objective lens to focus a data recording beam and a position mark recording beam on different positions in a thickness direction of a record area of said multilayer optical recording medium; a first data writing step of writing data in a first recording layer of said plurality of recording layers between said write-position marks with following said write-position marks by said data recording beam focused by said optical system; and a position mark recording step of, recording new write-position marks in a second recording layer of said plurality of recording layers as data is written in said first recording layer which is in a different position from said second recording layer in said thickness direction of said record area by said position mark recording beam focused by said optical system.

3. A fabrication method of a multilayer optical recording medium according to claim 1, wherein said multilayer optical recording medium is an optical disc, and said data recording beam and said position mark recording beam, record data and write-position marks in said record area in a spiral in a direction from the inner circumference to the outer circumference of said optical disc or a direction from the outer circumference to the inner circumference, while for each of said recording layers, switching the recording direction alternately.

4. A fabrication method of a multilayer optical recording medium according to claim 3, wherein there are a plurality of said data recording beams, and in said first data writing step, while one of said data recording beams, with following said write-position marks, records data between said write-position marks, each of the other data recording beams focused on different positions in a thickness direction of said record area by said optical system, records data onto the respective focused position simultaneously.

5. A fabrication method of a multilayer optical recording medium according to claim 1, further comprising a second data writing step of writing data between said new write-position marks with following said new write-position marks by said data recording beam.

6. A multilayer optical recording medium recording apparatus which records data into a record area of a multilayer optical recording medium having a plurality of recording layers, at least one of which has write-position marks, comprising: an optical system including a common objective lens to focus a data recording beam and a position mark recording beam on different positions in a thickness direction of said record area; data writing means for writing data in a first recording layer of said plurality of recording layers between said write-position marks with following said write-position marks by said data recording beam focused by said optical system; and position mark recording means for, recording new write-position marks in a second recording layer of said plurality of recording layers as data is written in said first recording layer which is in a different position from said second recording layer in said thickness direction of said record area by said position mark recording beam focused by said optical system.

7. A multilayer optical recording medium recording apparatus according to claim 6, wherein:
said data writing means comprises a first light source that emits a data recording beam of light intensity corresponding to data to be recorded and a reading beam to read said write-position marks by, and servo means that controls a focal position of said data recording beam;
said position mark recording means comprises a second light source that emits a position mark recording beam of light intensity corresponding to a write-position mark to be recorded;
said optical system has an irradiation optical path leading said data recording beam, said reading beam, and said position mark recording beam to said multilayer optical recording medium and a reflection optical path leading said reading beam reflected by said multilayer optical recording medium to a photo-detector; and
said servo means controls the focal position of said data recording beam based on an output signal of said photo-detector.

8. A multilayer optical recording medium recording apparatus according to claim 7, wherein said first light source and said second light source are each a femtosecond pulse laser.

* * * * *